May 8, 1928. 1,668,835
H. G. ALLEN
FISH LANDING NET
Filed March 4, 1927
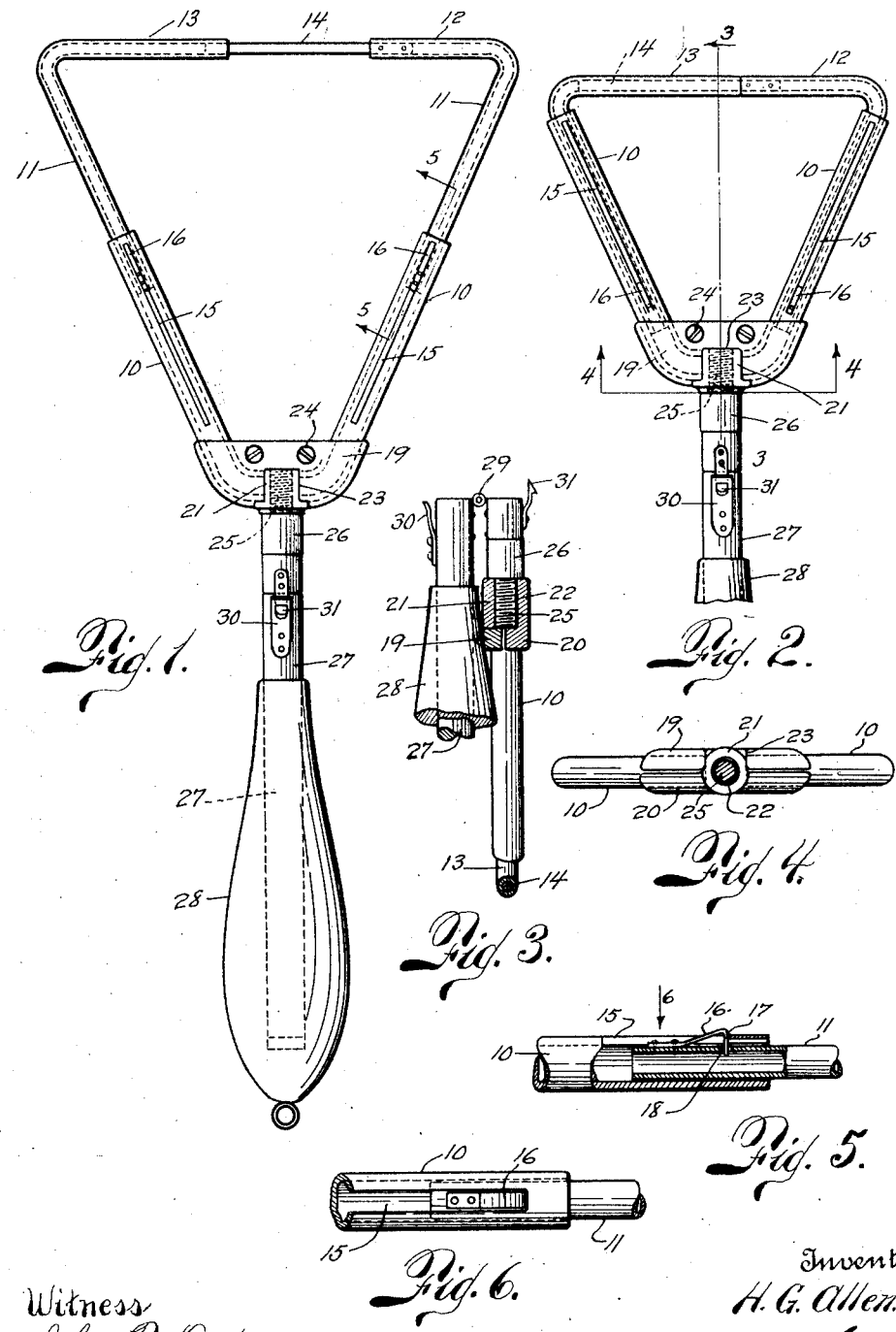
Inventor
H. G. Allen.
by Wilkinson & Ginsta
his Attorneys
Witness
John B. Dade.

Patented May 8, 1928.

1,668,835

UNITED STATES PATENT OFFICE.

HAROLD G. ALLEN, OF DENVER, COLORADO.

FISH-LANDING NET.

Application filed March 4, 1927. Serial No. 172,776.

This invention relates to nets and supporting structures therefor, and although the improvements are such as to be well adapted for various other analogous types of nets, such as those employed by entomologists, or dip nets and manually manipulated impounding nets in general, still the invention has been devised primarily with reference to landing nets, usually employed by anglers as is well understood.

Accordingly, for the sake of brevity and simplicity of disclosure, I have illustrated and will hereinafter describe the improvements with particular reference only to fish landing nets, but it is with the understanding that I do limit the invention to this or any other one particular use.

These landing nets as generally employed by practised anglers, esecially when wading a stream or traversing the shore line thereof, and whether the net be supported by a rigidly fixed frame or a folding one, are usually suspended from the upper body of the angler, ready for use, by elastic means attached to the handle thereof, so that when it is desired to use the same, for landing a game fish, the angler manipulates his net against the tension of said elastic suspension means, which latter retracts it by said elastic tension, supposedly out of the way for more convenient carriage when not in active use. However, in traversing a rugged shore line, or one that is more or less thicketed, the net is liable to get caught by snags, sometimes causing injury to the angler on its elastically retracted rebound, or it even may become enmeshed with a button on the angler's own clothing, or on some other form of projection, which is always very objectionable, and especially so at a critical moment for its instant use.

It accordingly has been proposed to provide a more or less hingedly folding collapsible type of a landing net frame support, which net together with its frame support, when collapsed, could be detachably carried within a pocket, out of the way of snags or the like, and which could be readily reached, withdrawn from said pocket, and whipped out into its fully distended position, for instant use, with the angler only employing one hand in the operations.

To a large extent, and broadly speaking, the foregoing is also one of the primary objects of my invention. In the attainment of the same, however, a further and very important object has been to devise a wholly practical embodiment of a device of this general character, which is not only durable and facilely operable at all times of use, but which is also so simple, with a minimum number of parts less liable to get out of order, that it may be manufactured and marketed at comparatively small expense, whether as assembled or with its parts detached, for economy of space in shipping or individual packaging, and which may be easily assembled for use during a fishing trip or a season, or knocked down for storing away or when forming a part of a compact traveling kit.

The foregoing and other objects and advantages, however will be more clearly apparent as incidental to the following disclosure, so that nothing would be gained by a further enlargement initially upon the same, and with these general outlining remarks, therefore, reference will now be immediately had to the accompanying drawings, illustrating certain practical embodiments of the improvements, although susceptible to variations without departing from the spirit of the invention, and in which drawings Figure 1 is a plan view of the device, with the net omitted, showing the net supporting frame in its distended or fully opened position, and also showing a handle therefor which is illustrated as being both hinged and of telescoping structure; Figure 2 is an analogous view, with a portion of the handle end broken away, and showing the net supporting frame in its contracted or closed position; Figure 3 is a substantially central longitudinal sectional view, taken along the line 3—3 of Figure 2, but with the hinged handle connection unlatched and the net supporting frame folded back, relatively thereto, for insertion in a fishing or hunting coat pocket, or other pocket detachably connected to the coat, if desired, or otherwise; Figure 4 is a transverse cross-sectional view, taken on the line 4—4 of Figure 2; Figure 5 is a fragmentary sectional view along the line 5—5 of Figure 1; and Figure 6 is a plan view looking in the direction of the arrow 6 of Figure 5.

The net supporting frame broadly embodies a pair of forwardly divergent rear arms and a congruently associated pair of forward arms which provide for movable continuing extensions of said rear arms, being connected to said rear arms in longitudinal sliding relation, and the outer ends of said forward arms being transversely connected in sliding relation.

This supporting frame may be of substantially triangular formation preferably (and I have illustrated and will describe it as such although it is not strictly essential in all respects that it be so formed) in which event the base thereof, as distinguished from its apex, would be disposed outwardly or forwardly away from the handle support for the frame, in order that the outer or dipping end of the net be of a greater width than its remaining portion, and which is more desirable. Also, while I shall describe the arms, of the net frame support, as being of tubular formation, as actually illustrated, still it is not strictly essential that said arms or all parts of them actually be tubular, although they are preferably so for telescoping purposes and simplicity and more finished construction generally; and I wish it to be understood, therefore, that I do not confine myself to all of the details as actually illustrated and described, excepting as they may come within the terms of the appended claims, or equivalent elements in combination, or as fairly interpreted in the light of the general disclosure if necessary.

The numeral 10 designates said pair of rear arms and 11 said pair of forward arms mounted in telescoping relation therewith, the outer ends of the forward arms being shown as bent inwardly, as at 12 and 13, to provide for inturned lateral projections that are disposed in line, and which are connected together, in sliding relation, as by means of an intermediate rod 14, or the like, that is secured to the shorter projection 12, while its other end is supported by the longer projection 13 in telescoping relation.

By this arrangement, the elements or sections 12—13—14 form, as it were, a compound forward cross-support, which is the base leg of the triangular frame, so that it will be observed that, when the frame is being either distended or contracted, the said compound cross-support is moved bodily in the longitudinal plane of the device, while also moving transversely thereof in its own plane.

Any suitable means may be employed for limiting the outward thrust of said forward pair of arms, but preferably said means should be such as to permit of the ready disjointing of the parts, when desired, as a knock-down structure.

To this end, there is provided a longitudinal slot 15 extending along either or both of said rear arms 10, and projecting from the forward arms 11, towards their inner ends, is carried a limiting stop that rides within a complementary one of said slots 15. This limiting stop could be a headed screw, sufficiently projected to engage the forward end of its slot 15 when the arms 11 are thrown out to their extended positions. However, I prefer to employ a spring stop as the limiting abutment, which is shown more clearly at Figures 5 and 6, and which simply comprises a spring member secured at its rear end to its arm 11 and forwardly extended as an upwardly inclined portion 16 that terminates in an inwardly disposed end or tooth 17 projected into a recess or an aperture 18, in its arm 11, in the manner of an umbrella latch spring, whereby it normally serves as an abutment or stop, but when pressed down may be caused to ride through the outer open end of its arm 10 for the disjointing of the arms 10 and 11 relatively to each other.

The apex end of the divergently forked arms 10 could be integrally joined, as where these arms were formed by a single piece of bent tubing, but as actually illustrated they are shown as separate members, being detachably supported in relatively fixed relation by means of a pair of clamping heads or blocks 19 and 20, suitably recessed to receive therebetween the inturned inner ends of the arms 10. The clamping head 20 is shown as formed with a central enlargement or boss 21, having a threaded bore 22 to provide a handle attaching screwthreaded socket, and the other clamping head 19, which is analogous to a facing plate or block, is centrally cut away to provide a rearside opening recess 23 for snugly encompassing said boss. The paired clamping heads are detachably connected together by any suitable means, such as the screws 24.

If desired, an inextensible and non-hinged handle could be employed, a relatively short handle being preferred by some anglers, and in such event the handle might simply consist of an appropriate shank 26, with or without a handle grip therefor, provided with a screw 25 projected from its inner end for threading into said socket 22; or as many others prefer, and most desirably perhaps, the handle could be of a non-hinged extensible form, with a handle grip telescoping on said shank that carries said end screw. In the actual illustration, however, as broadly embodying all of these features as well as a more specific one, which may be desirable for some uses, the handle is shown as consisting of a plurality of members, embodying both a hinging and telescoping connection therebetween. In this arrangement, the handle attaching end screw 25 is projected from a short shank or stud 26 which is hingedly connected, as at 29, to a longer shank section 27, over which the handle grip 28 telescopes, as is obvious. The shank sections 26 and 27, on opposite sides from the hinge connection 29, are provided with suitable coacting latching means, simply illustrated more or less conventionally by the springy clasp and catch elements 30 and 31. In the actual use of the net, in this specific employment of the handle element, the hinged side of the handle is preferably disposed uppermost, to avoid any undue strain on the latching means. Also, while I have shown and described the end screw 25 as projected from the handle, with the socket 22 carried by the clamping head, it is obvious that this arrangement might be reversed.

In hanging the net proper from its supporting frame, which is preferably done by means of rings, the rings at the apex and base corners of the frame should preferably be held against sliding movement on the frame, so that the net would always hang properly positioned in actual use, and indeed this might also be true, if desired, of the rings towards the forward ends of the rear arms 10, but the rings intermediately of the ends of the compound base leg 12—13—14, and intermediately of the ends of the arms 11, should be free to slide, to permit of the free distending and contracting of the net.

As the handle is of relatively short length normally, and this is also true even with the hinged and telescoping form of handle, the net and its frame support, with the latter's base disposed downwardly or inwardly, are normally housed within an inside pocket of the angler's coat, or in any equivalent manner, with the handle grip projecting in easy reach.

Accordingly, with a rigid handle, for instance, the net and its frame support may be facilely withdrawn from the pocket by the employment of one hand only, and with a whipping-like motion, in practically the same movement of the hand, the net and frame as so withdrawn are thrown out into their distended or full open position ready for instant use. If the handle is made of telescoping form, it will also become lengthened or fully extended during the same whipping-like motion.

With the hinged and telescoping form of handle for the net supporting frame, however, and if desired, the same could be carried in substantially the same way as before stated, or with the handle grip unlatched and folded down exteriorly of the pocket. In that case, the operation for handling the device would be substantially the same as before set forth, excepting that the handle's abutting ends would have to be whipped towards each other to cause the latching means, represented by the elements 30 and 31, to be brought into coacting latching relation, which however may be done very readily with the same one hand and in practically the same continuing operation, as will be apparent.

The manner of knocking down or disconnecting the parts, for compact packaging or storing away, will also be obvious, as likewise will be the manner of assembling the device for fishing purposes, but although I have thus fully disclosed the improvements, together with the objects, advantages and functioning of the same, it will nevertheless be understood that I do not restrict myself to all of the details exactly as shown and described, and as I have hereinbefore suggested, otherwise than as embodied in the following claims.

What I claim, as new and patentable, is:

1. A net support of the character disclosed, embodying a pair of forwardly divergent rear arms, mounted in relatively immovable relation, and a congruently associated pair of forward arms connected to said rear arms in longitudinal sliding relation, the outer ends of said forward arms being transversely connected in sliding relation.

2. A net support of the character disclosed, embodying a pair of forwardly divergent rear arms and a congruently associated pair of forward arms connected to said rear arms in longitudinal sliding relation, each of the said forward arms being provided at its outer end with an inturned projection, which projections are disposed in the same transverse longitudinal line and are slidingly connected together.

3. A net support of the character disclosed embodying a pair of forwardly divergent rear arms, a congruently associated pair of forward arms connected to said rear arms in longitudinal sliding relation, and means for limiting the outward thrust of said forward arms, each of the said forward arms being provided at its outer end with an inturned projection, which projections are disposed in the same transverse longitudinal line and are slidingly connected together.

4. A net support of the character disclosed, embodying a pair of forwardly divergent rear arms and a congruently associated pair of forward arms connected to said rear arms in telescoping relation, each of the said forward arms being provided at its outer end with an inturned projection, which projections are disposed in the same transverse line and are connected together in telescoping relation.

5. A net support of the character disclosed, embodying a pair of forwardly divergent rear arms, one of which is tubular, a congruently associated pair of forward arms connected to said rear arms in telescoping relation, said tubular rear arm having an elongated slot extending intermediately of the end portions thereof, and a stop element so carried by the inner end of one of said forward arms as to ride within said slot, for limiting the outward thrust of said forward arms, the outer ends of said forward arms being transversely connected in sliding relation.

6. A net support of the character disclosed, embodying a pair of forwardly divergent rear arms, one of which is tubular, a congruently associated pair of forward arms connected to said rear arms in telescoping relation, said tubular rear arm having an elongated slot extending intermediately of the end portions thereof, and a depressible abutment stop so carried by the inner end of one of said forward arms as to ride within said slot, for limiting the outward thrust of said forward arms, the outer ends of said forward arms being transversely connected in sliding relation.

7. A net support of the character disclosed, embodying a pair of forwardly divergent tubular rear arms, a congruently associated pair of forward arms connected to said rear arms in telescoping relation, each of said tubular rear arms having an elongated slot extending intermediately of its end portions, and a depressible spring abutment so carried by the inner ends of each of said forward arms as to ride within its complementary said slot, for limiting the outward thrust of said forward arms, each of the said forward arms being provided at its outer end with an inturned projection, which projections are disposed in the same transverse line and are connected together in telescoping relation.

8. A net support of the character disclosed, embodying a pair of forwardly divergent tubular rear arm, a congruently associated pair of forward tubular arms connected to said rear arms in telescoping relation, said forward arms having a longer and a shorter inturned section at their respective outer ends, and a connecting member for said inturned sections that is secured at one end to said shorter section and at its other end mounted in telescoping relation with said longer section.

9. In a device of the character disclosed, the combination of a rear support, a pair of forwardly divergent rear arms carried thereby, a congruently associated pair of forward arms connected to said rear arms in longitudinal sliding relation, the outer ends of said forward arms being transversely connected in sliding relation, means for limiting the outward thrust of said forward arms, and a handle for said rear support embodying a divided shank having its abutting ends hingedly connected and provided with coacting latching means.

10. In a device of the character disclosed, the combination of a rear support, a pair of forwardly divergent rear arms carried thereby, a congruently associated pair of forward arms connected to said rear arms in longitudinal sliding relation, the outer ends of said forward arms being transversely connected in sliding relation, means for limiting the outward thrust of said forward arms, and a handle for said rear support embodying a shank element and a handle grip carried by said shank element in telescoping relation therewith.

11. In a device of the character disclosed, the combination of a rear support, a pair of forwardly divergent rear arms carried thereby, a congruently associated pair of forward arms connected to said rear arms in longitudinal sliding relation, the outer ends of said forward arms being transversely connected in sliding relation, means for limiting the outward thrust of said forward arms, and a handle for said rear support embodying a divided shank, having its abutting ends hingedly connected and provide with coacting latching means therebetween, an a handle grip carried by the outer section of said shank in telescoping relation therewith.

In testimony whereof, I affix my signature.

HAROLD G. ALLEN.